United States Patent
Demasi et al.

(10) Patent No.: US 12,034,717 B2
(45) Date of Patent: Jul. 9, 2024

(54) SYSTEMS AND METHODS FOR FIRMWARE PASSWORD MANAGEMENT

(71) Applicant: Verizon Patent and Licensing Inc., Basking Ridge, NJ (US)

(72) Inventors: Rocco Demasi, Nanuet, NY (US); Jason M. Iannelli, Township of Washington, NJ (US); Ronald L. Bland, Woodstock, GA (US); Michael McGuinness, Hilliard, OH (US); Lori L Crimmins, Holly, MI (US); Michael L. Bowman, London, OH (US); Daniel J. Pfennig, Brockport, NY (US); Kevin R. Garrison, Wesley Chapel, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 98 days.

(21) Appl. No.: 17/570,731

(22) Filed: Jan. 7, 2022

(65) Prior Publication Data

US 2023/0224296 A1 Jul. 13, 2023

(51) Int. Cl.
*H04L 29/06* (2006.01)
*G06F 21/57* (2013.01)
*H04L 9/40* (2022.01)

(52) U.S. Cl.
CPC ........ *H04L 63/0846* (2013.01); *G06F 21/572* (2013.01); *H04L 63/20* (2013.01)

(58) Field of Classification Search
CPC .... H04L 63/0846; H04L 63/20; G06F 21/572
See application file for complete search history.

(56) References Cited

U.S. PATENT DOCUMENTS

| | | | |
|---|---|---|---|
| 8,291,406 B2 | 10/2012 | Milne et al. | |
| 8,688,853 B2 | 4/2014 | Clune et al. | |
| 8,756,700 B2 | 6/2014 | Demasi et al. | |
| 2018/0316676 A1* | 11/2018 | Gilpin | H04L 9/0891 |
| 2021/0406376 A1* | 12/2021 | Sayapin | G06F 21/572 |

* cited by examiner

*Primary Examiner* — Evans Desrosiers

(57) ABSTRACT

One or more computing devices, systems, and/or methods for managing a firmware password of a User Equipment (UE) are provided. In an example, the UE determines that a first firmware password variable is indicative of a firmware password of a firmware of the UE. The UE transmits the first firmware password variable to a first computer for storage in a first dataset. The UE generates a password. The UE sets a second firmware password variable, in a second dataset stored on the UE, to the password. The UE transmits the second firmware password variable including the password to the first computer for storage in the first dataset. The UE sets the firmware password of the firmware of the UE to the second firmware password variable including the password.

20 Claims, 6 Drawing Sheets

SYSTEMS AND METHODS FOR FIRMWARE PASSWORD MANAGEMENT

BACKGROUND

A password may be used for accessing firmware settings of a User Equipment (UE), installing and/or modifying an operating system (OS) of the UE, re-imaging the UE, etc. A technician may use the password to provide technical support for the UE. However, the password may also be used by a malicious entity to at least one of hack the firmware of the UE, change firmware settings of the firmware, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
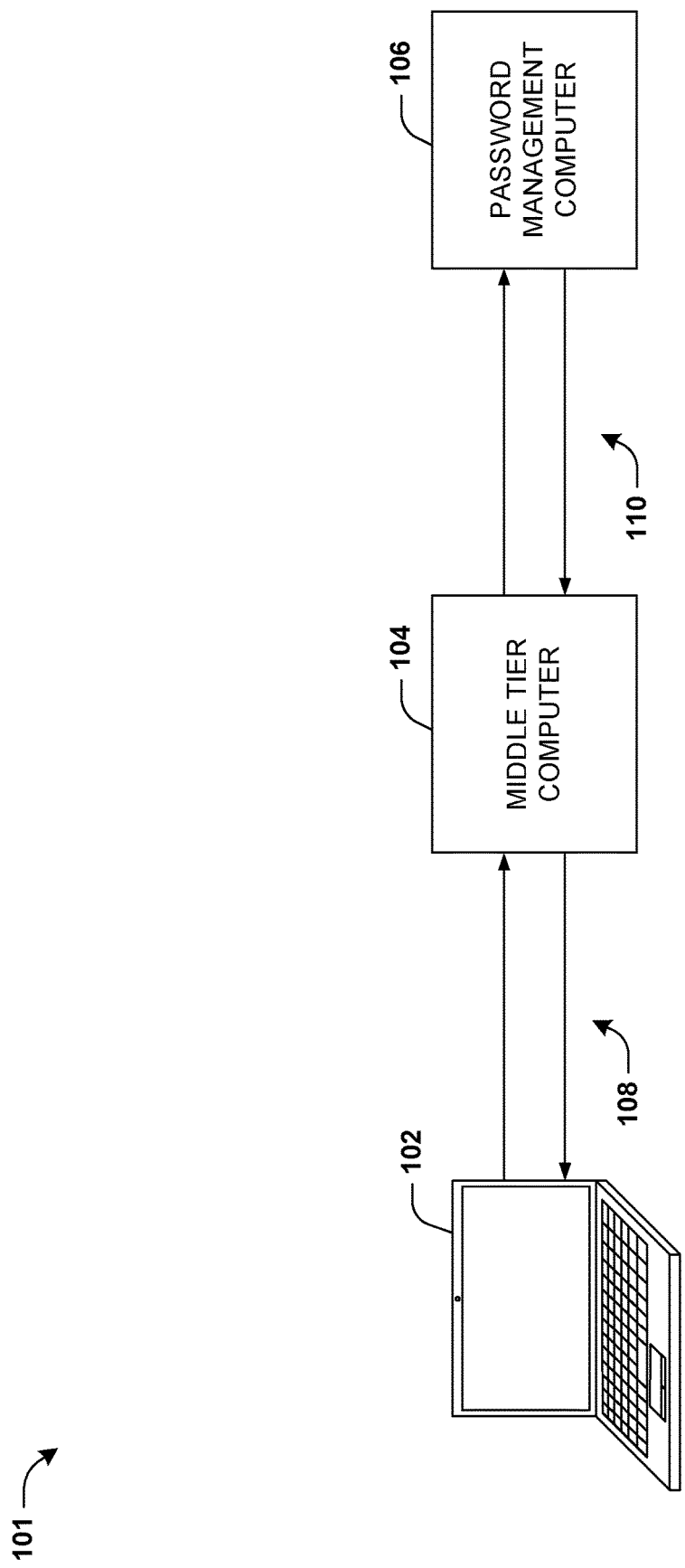
FIG. 1 is a diagram illustrating a firmware password management system in accordance with an embodiment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for managing firmware passwords associated with UEs using a password management computer are provided. A firmware password of firmware of a User Equipment (UE) may be required to perform one or more operations comprising at least one of installing and/or modifying an operating system (OS) on the firmware, installing and/or modifying software on the firmware, accessing and/or changing one or more firmware settings of the firmware, booting the UE using image data (e.g., image data on external media), updating the firmware and/or the OS on the firmware, re-imaging the firmware, etc. For example, without a valid firmware password, the one or more operations may be prevented from being performed (to secure the firmware and/or the UE from malicious entities, such as hackers, bots, etc.).

In some systems, a plurality of UEs (e.g., UEs corresponding to a first UE type, such as UEs produced by a first manufacturer) may each have the same firmware password that is rotated once every three months (or other period of time). Accordingly, in those systems, if a malicious entity were to obtain the firmware password of the plurality of UEs, the malicious entity may have access to firmware of the plurality of UEs for up to three months, thus allowing a security breach by the malicious entity during the three months.

In some systems, there are UEs of different types (e.g., UEs having at least one of different manufacturers, different models, etc.). Since firmware password functions and/or classes are different across different types of UEs, it is difficult to manage firmware passwords of the different types of UEs.

Accordingly, a firmware password management system is provided herein that may manage firmware passwords of a plurality of UEs, wherein UEs of the plurality of UEs may be associated with different UE types. Using one or more of the techniques herein, firmware passwords of the plurality of UEs may be rotated (e.g., changed) after use to prevent a security breach. Operations for performing firmware password rotation of a UE may be performed (e.g., automatically performed) based upon a UE type of the UE (such that the operations are performed correctly and/or without errors, for example). Alternatively and/or additionally, a firmware password of firmware of the UE may be stored in multiple locations, such as in a first dataset (e.g., a UE registry) of the UE and/or in a second dataset (e.g., a firmware password database) of a password management computer. The first dataset and/or the second dataset may be encrypted to prevent unauthorized access. The password management computer may be used to provide an authorized UE (e.g., an authorized technical support UE) with access to the firmware password of the UE. Accordingly, using one or more of the techniques herein, the password management computer and/or the UE may be used to provide the firmware password to a technical support device (such that technical support services can be performed on the UE, for example). Alternatively and/or additionally, the password management computer and/or the UE may be used to perform a firmware password rotation process to secure the firmware of the UE (to prevent malicious and/or unauthorized access to the firmware of the UE, for example). Alternatively and/or additionally, the password management computer and/or the UE may be used to store and/or maintain records associated with the firmware password of the UE.

FIG. 1 illustrates an example of a firmware password management system 101 comprising a UE 102, a middle tier computer 104 and/or a password management computer 106. In an example, the UE 102 may comprise at least one of a laptop, a desktop computer, a phone, a computer, a wearable device, a smart device, a television, any other type of computing device, Internet-of-Things (IoT) device, hardware, etc. In an example, the UE 102 may comprise a laptop and/or a desktop computer, wherein an OS of the laptop and/or the desktop computer may be Microsoft Windows (or other type of OS). A first dataset may be stored on the UE 102 and a second dataset may be stored on the password management computer 106. One or more firmware password variables associated with firmware of the UE 102 are stored in the first dataset and the second dataset. The one or more firmware password variables may be changed on the first dataset and/or the second dataset during a firmware password rotation process to perform firmware password rotation of the firmware of the UE 102.

In some examples, the UE 102 may communicate with the middle tier computer 104 and/or the middle tier computer 104 may communicate with the password management computer 106. In an example, first communication 108 (e.g., data traffic) between the UE 102 and the middle tier computer 104 may be encrypted (e.g., at least one of Transport Layer Security (TLS) encrypted, Secure Sockets Layer (SSL) encrypted, Hypertext Transfer Protocol Secure (HTTPS) encrypted, etc.), such as using TLS 1.2 encryption or other type of encryption. Alternatively and/or additionally, the first communication 108 may be performed using certificate pinning. Second communication 110 (e.g., data traffic) between the middle tier computer 104 and the password management computer 106 may be encrypted (e.g., at least one of TLS encrypted, SSL encrypted, HTTPS encrypted, etc.), such as using TLS 1.2 encryption or other type of encryption. In some examples, the UE 102 and the password management computer 106 do not directly communicate with each other (e.g., information transmitted between the UE 102 and the password management computer 106 may be through the middle tier computer 104, such as using the middle tier computer 104 to run Infrastructure as a Service (IaaS)). The middle tier computer 104 may provide one or more security services to inhibit unauthorized access to information in the second dataset of the password management computer 106, thereby providing for increased security of the information in the second dataset. Embodiments are contemplated in which the UE 102 and the password management computer 106 directly communicate with each other (e.g., without the middle tier computer 104).

In some examples, a connection (e.g., an HTTPS connection or other type of connection) is established between the UE 102 and the middle tier computer 104. The UE 102 may transmit one or more credentials (e.g., credentials that identify the UE 102) and/or the middle tier computer 104 may identify the UE 102 based upon the one or more credentials. In some examples, the connection is established using the one or more credentials. Alternatively and/or additionally, one or more firmware management services may be provided for the UE 102 by the middle tier computer 104 and/or the password management computer 106 based upon the one or more credentials (e.g., information applicable to the UE 102, such as one or more firmware password variables, may be identified from the second dataset based upon a determination that the information is associated with the one or more credentials provided by the UE 102).

In some examples, firmware password management software may be installed (e.g., automatically installed) on the UE 102. One or more acts discussed herein with respect to the UE 102 may be performed using the firmware password management software. In an example, the UE 102 may communicate with the middle tier computer 104 using the firmware password management software (e.g., the UE 102 may communicate with the middle tier computer 104 according to instructions of the firmware password management software).

In some examples, a firmware password rotation process may be initiated. In an example, the firmware password rotation process may be performed using the UE 102, the middle tier computer 104 and/or the password management computer 106. The firmware password rotation process may be performed to change a firmware password of the firmware of the UE 102 to a different value. The firmware password rotation process may be initiated (by the UE 102, the middle tier computer 104 and/or the password management computer 106, for example) in response to a determination that one or more conditions are met. In some examples, whether the one or more conditions are met may be determined and/or the firmware password rotation process may be initiated (by the UE 102, for example) using the firmware password management software.

In an example, the one or more conditions may comprise a first condition that a current time (e.g., at least one of a current date, a current time of day, etc.) is the same as or after a firmware password rotation time (e.g., at least one of a date, a time of day, etc.). In an example in which the current time is Jan. 20, 2022 and the firmware password rotation time is Jan. 20, 2022, the first condition is met. In an example in which the current time is 4:55 PM on Jan. 20, 2022 and the firmware password rotation time is 5:00 PM on Jan. 20, 2022, the first condition is not met. In some examples, the current time and the firmware password rotation time are according to the same time standard and/or time zone (e.g., Coordinated Universal Time (UTC)).

The firmware password rotation time may be based upon an access time associated with providing a second UE with access to the firmware password of the UE 102. The second UE may be a technical support UE. For example, the second UE may be used to provide technical support, for the UE 102, using the firmware password. In an example, the technical support may be provided for the UE 102 via a remote connection between the second UE and the UE 102. Alternatively and/or additionally, a user of the second UE (e.g., a technician) may retrieve the firmware password using the second UE and provide the technical support on the UE 102 (e.g., in person). In an example, the technical support may comprise at least one of installing and/or modifying an OS on the firmware of the UE 102, installing and/or modifying software on the firmware, accessing and/or changing one or more firmware settings of the firmware, booting the UE 102 using image data (e.g., image data on external media), updating the firmware and/or the OS on the firmware, re-imaging the firmware, etc.

In an example, the second UE may interact with a firmware password retrieval application (e.g., at least one of a web application, a network element, a mobile application, etc.) to retrieve the firmware password. The firmware password retrieval application may be used for providing authorized users (e.g., authorized technicians) with access to firmware passwords associated with UEs. In some examples, the firmware password retrieval application may display a firmware password retrieval interface (e.g., a web page of the firmware password retrieval application) via the second UE. The firmware password retrieval application may transmit a first request to provide the second UE with access to the firmware password to the middle tier computer 104. In an example, the firmware password retrieval application may transmit the first request in response to one or more inputs received via the firmware password retrieval interface (e.g., the one or more inputs may comprise a selection of a selectable input of the firmware password retrieval interface). In some examples, the first request may identify the UE 102 and/or the firmware of the UE 102 for which the firmware password is requested. Alternatively and/or additionally, the first request may comprise authentication information associated with the second UE. The authentication information may be based upon one or more inputs received via the firmware password retrieval interface. In an example, the authentication information may comprise a username and/or a password (and/or other authentication information) associated with a user of the second UE. Alternatively and/or additionally, the authentication information may indicate whether the user of the second UE is authorized to access the firmware password of the UE 102. Alternatively and/or additionally, the second UE may transmit the first request to the middle tier computer 104.

In response to the middle tier computer 104 receiving the first request, the middle tier computer 104 may transmit a second request, for the firmware password, to the password management computer 106. The second request may comprise authentication information (e.g., the authentication information of the second request may be based upon and/or the same as the authentication information of the first request). The firmware password may be stored in the second dataset on the password management computer 106. In some examples, the password management computer 106 may identify the firmware password in the second dataset and provide the firmware password to the middle tier computer 104. For example, the password management computer 106 may transmit the information indicative of the firmware password to the middle tier computer 104 based upon a determination that the user and/or the second UE are authorized to access the firmware password (e.g., the determination may be based upon the authorization information of the second request). In some examples, the firmware password (and/or other information, such as other passwords) stored in the second dataset of the password management computer 106 may be an encrypted password (e.g., encrypted using Advanced Encryption Standard (AES) encryption such as AES 256-bit encryption, or encrypted using other type of encryption). The firmware password transmitted by the password management computer 106 to the middle tier computer 104 may be the encrypted password, wherein the middle tier computer 104 may decrypt the encrypted password. The middle tier computer 104 may encrypt (e.g., re-encrypt using AES encryption such as AES 256-bit encryption, or re-encrypt using other type of encryption) the firmware password and/or transmit the firmware password (e.g., encrypted by the middle tier computer 104) to the firmware password retrieval application using at least one of TLS, SSL, HTTPS, etc., such as using TLS 1.2. The firmware password retrieval application may transmit the firmware password to the second UE (e.g., firmware password may be used to provide technical support for the UE 102). The second UE may decrypt the firmware password. The second UE may decrypt the firmware password using a key, such as a key known to the second UE and the middle tier computer 104 (e.g., the key may correspond to a shared secret between the second UE and the middle tier computer 104, wherein the middle tier computer 104 may encrypt the firmware password using the key).

In some examples, identification information of the second UE, the first request and/or the second request may be recorded by the firmware password retrieval application, the middle tier computer 104 and/or the password management computer 106. For example, the identification information may be stored on the firmware password retrieval application, the middle tier computer 104 and/or the password management computer 106. Accordingly, the identification information may be used to determine which UE and/or technician was provided with access to the firmware password (and/or at what time the UE and/or the technician were provided with access to the firmware password). In an example, the identification information may be displayed via a device interface.

In some examples, a future firmware password rotation process for the firmware password is triggered by at least one of the first request, the second request and/or the second UE being provided with access to the firmware password. A firmware password rotation time associated with the future firmware password rotation process is determined (by the firmware password retrieval application, the middle tier computer 104 and/or the password management computer 106, for example) based upon an access time associated with providing the second UE with access to the firmware password of the UE 102. The access time may correspond to (and/or may be based upon) a time of transmission of the first request, a time of transmission of the second request, a time of transmission of the firmware password to the middle tier computer 104 and/or a time of transmission of the firmware password to the second UE and/or the firmware password retrieval application. The firmware password rotation time may be stored in the second dataset of the password management computer 106. The password management computer 106 may transmit an indication of the firmware password rotation time to the middle tier computer 104 and/or the middle tier computer 104 may transmit the indication of the firmware password rotation time to the UE 102.

In an example, one or more operations (e.g., mathematical operations) may be performed using the access time and a duration of time (e.g., a defined duration of time) to determine the firmware password rotation time. For example, the firmware password rotation time may be set to a time that is the duration of time after the access time (e.g., the duration of time may correspond to a delay from the access time to the firmware password rotation time). In an example in which the duration of time is 24 hours and the access time 5:00 PM on Jan. 19, 2022, the firmware password rotation time may be 5:00 PM on Jan. 20, 2022. In the example, the first condition of the one or more conditions may be met at 5:00 PM on Jan. 20, 2022 and/or after 5:00 PM on Jan. 20, 2022. The firmware password rotation process may be performed (e.g., performed automatically) in response to the first condition being met.

Alternatively and/or additionally, the firmware password rotation time may be set based upon a message from a third UE, such as a technical support UE (e.g., the message may be indicative of the firmware password rotation time). For example, the firmware password rotation time may be set based upon one or more inputs received via an interface of the third UE.

In some examples, the one or more conditions may comprise a second condition that there is authorization to perform the firmware password rotation process for the firmware password of the UE 102. A determination that there is authorization to perform the firmware password rotation process may correspond to at least one of a determination that the UE 102 is authorized to perform the firmware password rotation process (using the firmware password management software, for example), a determination that the middle tier computer 104 and/or the password management computer 106 are authorized to access and/or manage the firmware password of the UE 102, etc. In an example, the UE 102 may perform a determination of whether there is authorization to perform the firmware password rotation process based upon an indication (e.g., a registry flag) in the first dataset of the UE 102. In some examples, the indication may be set externally.

In some examples, the UE 102 may initiate and/or perform the firmware password rotation process in response to determining that the one or more conditions are met. The one or more conditions may comprise one or more other conditions other than the first condition and/or the second condition. In some examples, the UE 102 may perform a condition check (e.g., determine whether the one or more conditions are met) periodically (e.g., once per 15 minutes, once per 30 minutes, once per 24 hours, etc.). In some examples, to determine whether the first condition is met, the UE 102 may transmit a request for password rotation status to the middle tier computer 104. The middle tier computer 104 may communicate with the password management computer 106 to determine information indicative of whether the first condition is met. For example, the password management computer 106 may determine whether the current time meets the firmware password rotation time and/or may transmit an indication of whether the first condition is met to the middle tier computer 104. The middle tier computer 104 may transmit the information to the UE 102 and/or the UE 102 may determine whether the first condition is met based upon the information.

Alternatively and/or additionally, the middle tier computer 104 and/or the password management computer 106 may determine whether the one or more conditions are met. In response to a determination that the one or more conditions are met, the middle tier computer 104 and/or the password management computer 106 may transmit (e.g., automatically transmit) an instruction, to the UE 102, instructing the UE 102 to initiate and/or perform the firmware password rotation process. The UE 102 may initiate and/or perform the firmware password rotation process (e.g., automatically) in response to the one or more conditions being met (e.g., in response to receiving the instruction to initiate and/or perform the firmware password rotation process). In an example, the UE 102 may initiate and/or perform the firmware password rotation process (e.g., automatically) in response to an event, wherein the event comprises a determination that the one or more conditions are met (and/or the event comprises a determination that the current time is the same as or after the firmware password rotation time).

Alternatively and/or additionally, firmware password rotation processes may be initiated and/or performed (e.g., automatically) by the UE 102, the middle tier computer 104 and/or the password management computer 106 periodically (e.g., once per duration of time, such as once per day, once per week, etc.).

Figure 2:
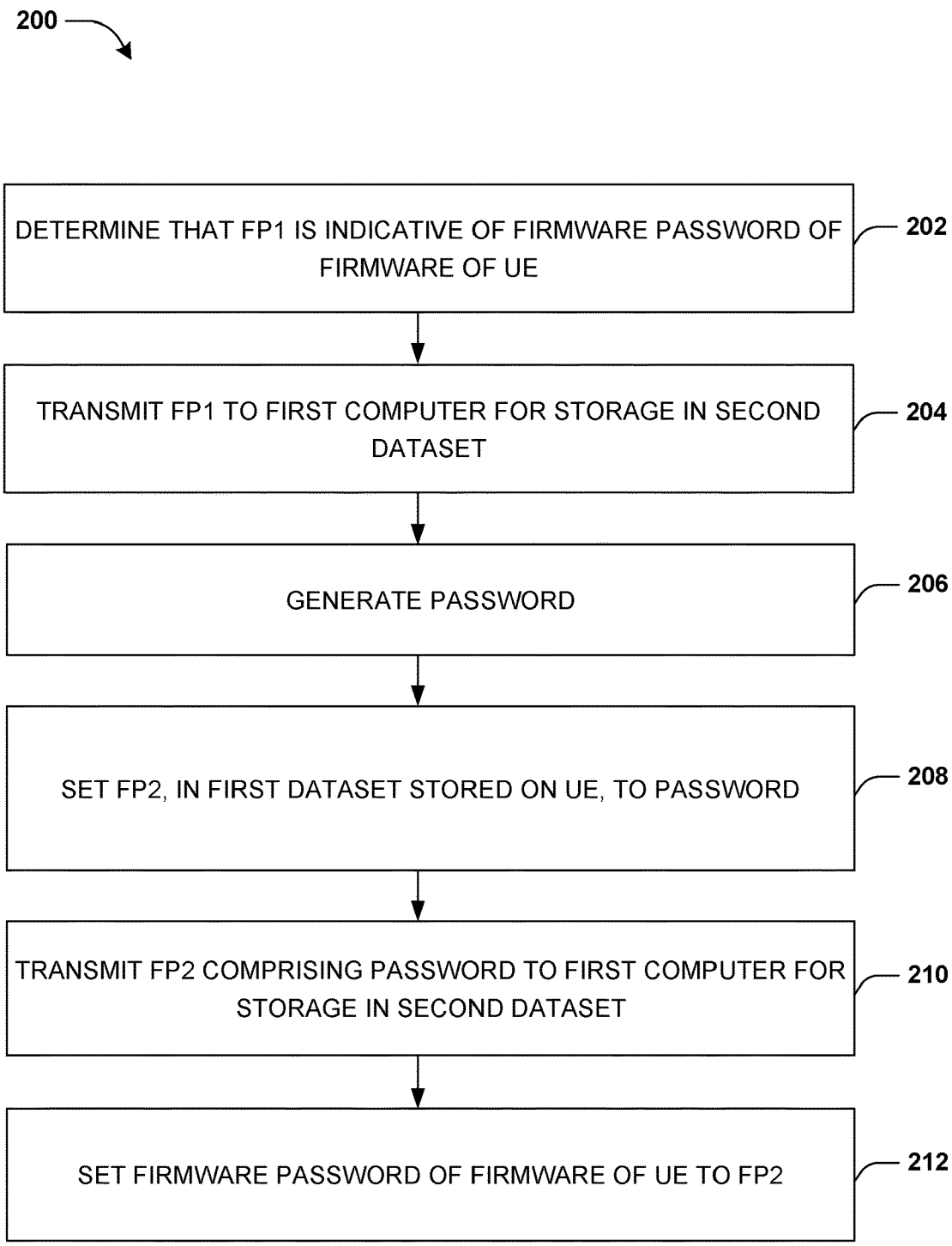
FIG. 2 is a flow chart illustrating a method for performing a firmware password rotation process in accordance with an embodiment.

An embodiment of performing the firmware password rotation process is illustrated by method 200 of FIG. 2, and is further described in conjunction with FIG. 1. In some examples, a plurality of firmware password variables associated with the firmware of the UE 102 may be stored in the first dataset of the UE 102 and/or the second dataset of the password management computer 106. The plurality of firmware password variables may be possible values of the firmware password. In an example, the plurality of firmware password variables comprises a first firmware password variable (hereinafter "FP1" for firmware password 1) and a second firmware password variable (hereinafter "FP2" for firmware password 2). In an example, FP1 and FP2 are stored in the first dataset of the UE 102 and FP1 and FP2 are stored in the second dataset of the password management computer 106. FP1 may correspond to a current value of the firmware password of the UE 102. There may be a time in which FP1 is not the current value of the firmware password of the UE 102 (e.g., at the time, the current value of the firmware password may be FP2 or other value). There may be a time in which a firmware password variable of the plurality of firmware password variables comprises a value in the first dataset of the UE 102 that is different than a value of the firmware password variable in the second dataset of the password management computer 106. For example, there may be a time in which FP1 stored in the first dataset is different than FP1 stored in the second dataset. Alternatively and/or additionally, there may be a time in which FP2 stored in the first dataset is different than FP1 stored in the second dataset.

In some examples, the UE 102 may determine one or more firmware password variables of the plurality of firmware password variables. In some examples, the UE 102 may analyze the first dataset of the UE 102 to determine whether FP1 is stored in the first dataset. In response to a determination that an indication of FP1 is stored in the first dataset, the UE 102 may determine FP1 based upon the indication in the first dataset. Alternatively and/or additionally, the UE 102 may perform one or more operations to determine whether an indication of FP1 is stored in the second dataset of the password management system 106 and/or determine FP1 based upon the indication of FP1 (if the indication of FP1 is stored in the second dataset, for example). In an example, the UE may perform the one or more operations in response to a determination that FP1 is not stored in the first dataset. For example, the one or more operations may comprise the UE 102 transmitting a request for FP1 to the middle tier computer 104. In response to receiving the request from the UE 102, the middle tier computer 104 may transmit a request for FP1 to the password management system 106. The password management system 106 may analyze the second dataset (of the password management system 106) to determine whether FP1 is stored in the second dataset. If FP1 is stored in the second dataset, the password management system 106 may transmit an indication of FP1 to the middle tier computer 104. In response to receiving the indication of FP1 from the password management system 106, the middle tier computer 104 may transmit the indication of FP1 to the UE 102. The one or more operations may comprise the UE 102 receiving the indication and/or determining FP1 based upon the indication. Alternatively and/or additionally, if FP1 is not stored in the second dataset of the password management system 106, the middle tier computer 104 may transmit an indication that FP1 is not stored in the second dataset to the UE 102. The UE may determine that FP1 is not available based upon a determination that FP1 is not stored in the first dataset and is not stored in the second dataset.

In some examples, the UE 102 may analyze the first dataset of the UE 102 to determine whether FP2 is stored in the first dataset. In response to a determination that an indication of FP2 is stored in the first dataset, the UE 102 may determine FP2 based upon the indication in the first dataset. Alternatively and/or additionally, the UE 102 may perform one or more operations to determine whether an indication of FP2 is stored in the second dataset of the password management system 106 and/or determine FP2 based upon the indication of FP2 (if the indication of FP2 is stored in the second dataset, for example). In an example, the UE may perform the one or more operations in response to a determination that FP2 is not stored in the first dataset. For example, the one or more operations may comprise the UE 102 transmitting a request for FP2 to the middle tier computer 104. In response to receiving the request from the UE 102, the middle tier computer 104 may transmit a request for FP2 to the password management system 106.

The password management system 106 may analyze the second dataset (of the password management system 106) to determine whether FP2 is stored in the second dataset. If FP2 is stored in the second dataset, the password management system 106 may transmit an indication of FP2 to the middle tier computer 104. In response to receiving the indication of FP2 from the password management system 106, the middle tier computer 104 may transmit the indication of FP2 to the UE 102. The one or more operations may comprise the UE 102 receiving the indication and/or determining FP2 based upon the indication. Alternatively and/or additionally, if FP2 is not stored in the second dataset of the password management system 106, the middle tier computer 104 may transmit an indication that FP2 is not stored in the second dataset to the UE 102. The UE may determine that FP2 is not available based upon a determination that FP2 is not stored in the first dataset and is not stored in the second dataset.

In some examples, by storing the plurality of firmware password variables in the second dataset of the password management computer 106, a firmware password variable of the plurality of firmware passwords may be accessed and/or retrieved (using one or more of the techniques herein) even if the firmware password variable is deleted from the first dataset of the UE 102 (e.g., the firmware password variable may be deleted in the event of data on memory of the UE 102 being deleted, such as when a hard drive of the UE 102 is blanked).

In some examples, the UE 102 may determine whether FP1 is the firmware password of the UE 102. For example, the UE 102 may determine whether FP1 is the firmware password of the UE 102 if FP1 is available (e.g., if the UE 102 is able to determine FP1 using the first dataset of the UE 102 and/or the second dataset of the password management computer 106). In some examples, the UE 102 may determine whether FP1 is the firmware password by attempting to use FP1 as the firmware password (e.g., the UE 102 may determine whether FP1 is the firmware password based upon a result of the attempt to use FP1 as the firmware password). In some examples, the UE 102 may perform one or more operations to determine whether FP1 is the firmware password of the UE 102 (e.g., the UE 102 may perform the one or more operations to attempt to use FP1 as the firmware password). In an example, the one or more operations performed by the UE may comprise inputting FP1 as the firmware password via a firmware interface of the firmware of the UE 102. The one or more operations may be based upon a UE type of the UE 102. For example, the UE type may correspond to a manufacturer of the UE 102 and/or a model of the UE 102. In an example, the one or more operations (for determining whether FP1 is the firmware password and/or attempting FP1 as the firmware password) differ between UE types. For example, if the UE type is a first UE type, the one or more operations may be one or more first operations, and/or if the UE type is a second UE type, the one or more operations may be one or more second operations different than the one or more first operations. In some examples, one or more first classes, functions and/or modules used in the one or more first operations are different than one or more second classes, functions and/or modules used in the one or more second operations. In an example, the one or more first classes, functions and/or modules may comprise one or more first Windows Management Instrumentation (WMI) classes defined for UEs of a first manufacturer of the first UE type and the one or more second classes, functions and/or modules may comprise one or more second WMI classes defined for UEs of a second manufacturer of the second UE type. The firmware password management software may comprise instructions for the UE 102 to perform the one or more first operations (with the one or more first classes, functions and/or modules) if the UE 102 is the first UE type (and/or the firmware password management software may instruct the UE 102 to perform the one or more first operations with the one or more first classes, functions and/or modules if the UE 102 is the first UE type). In an example, the one or more first operations may comprise one or more first WMI calls (corresponding to the one or more first WMI classes, for example). Alternatively and/or additionally, the firmware password management software may comprise instructions for the UE 102 to perform the one or more second operations (with the one or more second classes, functions and/or modules) if the UE 102 is the second UE type (and/or the firmware password management software may instruct the UE 102 to perform the one or more second operations with the one or more second classes, functions and/or modules if the UE 102 is the second UE type). In an example, the one or more second operations may comprise one or more second WMI calls (corresponding to the one or more second WMI classes, for example). Accordingly, the one or more operations may be performed (for determining whether FP1 is the firmware password and/or attempting FP1 as the firmware password) according to the UE type of the UE 102, wherein by performing the one or more operations, the UE 102 may correctly determine whether FP1 is the firmware password of the UE 102.

In some examples, the UE 102 may determine whether FP2 is the firmware password of the UE 102. For example, the UE 102 may determine whether FP2 is the firmware password of the UE 102 if FP2 is available (e.g., if the UE 102 is able to determine FP2 using the first dataset of the UE 102 and/or the second dataset of the password management computer 106). Alternatively and/or additionally, the UE 102 may determine whether FP2 is the firmware password of the UE 102 in response to a determination that FP1 is not available (e.g., the UE 102 is not able to determine FP1 using the first dataset and/or the second dataset) and/or a determination that FP1 is not the firmware password of the UE 102. In some examples, the UE 102 may determine whether FP2 is the firmware password by attempting to use FP2 as the firmware password (e.g., the UE 102 may determine whether FP2 is the firmware password based upon a result of the attempt to use FP2 as the firmware password). In some examples, the UE 102 may perform one or more operations to determine whether FP2 is the firmware password of the UE 102 (e.g., the UE 102 may perform the one or more operations to attempt to use FP2 as the firmware password). In an example, the one or more operations performed by the UE may comprise inputting FP2 as the firmware password via the firmware interface of the firmware of the UE 102. The one or more operations may be based upon the UE type of the UE 102. For example, one or more classes, functions and/or modules used in the one or more operations may be based upon the UE type of the UE 102 (such as discussed with respect to determining whether FP1 is the firmware password of the UE 102). Accordingly, the one or more operations may be performed (for determining whether FP2 is the firmware password and/or attempting FP2 as the firmware password) according to the UE type of the UE 102, wherein by performing the one or more operations, the UE 102 may correctly determine whether FP2 is the firmware password of the UE 102.

In some examples, the UE 102 may determine whether a default firmware password is the firmware password of the UE 102. In an example, the default firmware password may correspond to a default firmware password that is installed by a manufacturer of the UE 102. Alternatively and/or additionally, the default firmware password may correspond to a default firmware password of a plurality of UEs (e.g., a plurality of UEs that are owned and/or used by an entity, such as at least one of a company, a business, an organization, etc., wherein the entity may install the default firmware password on the plurality of UEs). For example, the UE 102 may determine whether the default firmware password is the firmware password of the UE 102 in response to a determination that FP1 is not available (e.g., the UE 102 is not able to determine FP1 using the first dataset and/or the second dataset), a determination that FP1 is not the firmware password of the UE 102, a determination that FP2 is not available (e.g., the UE 102 is not able to determine FP2 using the first dataset and/or the second dataset) and/or a determination that FP2 is not the firmware password of the UE 102. In some examples, the UE 102 may determine whether the default firmware password is the firmware password by attempting to use the default firmware password as the firmware password (e.g., the UE 102 may determine whether the default firmware password is the firmware password based upon a result of the attempt to use the default firmware password as the firmware password). In some examples, the UE 102 may perform one or more operations to determine whether the default firmware password is the firmware password of the UE 102 (e.g., the UE 102 may perform the one or more operations to attempt to use the default firmware password as the firmware password). In an example, the one or more operations performed by the UE may comprise inputting the default firmware password as the firmware password via the firmware interface of the firmware of the UE 102. The one or more operations may be based upon the UE type of the UE 102. For example, one or more classes, functions and/or modules used in the one or more operations may be based upon the UE type of the UE 102 (such as discussed with respect to determining whether FP1 is the firmware password of the UE 102). Accordingly, the one or more operations may be performed (for determining whether the default firmware password is the firmware password and/or attempting the default firmware password as the firmware password) according to the UE type of the UE 102, wherein by performing the one or more operations, the UE 102 may correctly determine whether the default firmware password is the firmware password of the UE 102.

In a first example scenario, it may be determined that FP1 is the firmware password. In response to determining that FP1 is the firmware password, the UE 102 may not change FP1 in the first dataset of the UE 102. Thus, FP1 in the first dataset is the firmware password of the UE 102.

In a second example scenario, it may be determined that FP2 is the firmware password. In response to determining that FP2 is the firmware password, the UE 102 may set FP1 in the first dataset of the UE 102 to FP2 comprising the firmware password. Thus, after setting FP1 in the first dataset to FP2, FP1 in the first dataset is the firmware password of the UE 102.

In a third example scenario, it may be determined that the default firmware password is the firmware password. In response to determining that the default firmware password is the firmware password, the UE 102 may set FP1 in the first dataset of the UE 102 to the default firmware password comprising the firmware password. Thus, after setting FP1 in the first dataset to the default firmware password, FP1 in the first dataset is the firmware password of the UE 102.

In a fourth example scenario, it may be determined that the default firmware password is the firmware password. In response to determining that the default firmware password is the firmware password, the UE 102 may set FP1 in the first dataset of the UE 102 to a value indicative of the default firmware password. Thus, after setting FP1 in the first dataset to the value indicative of the default firmware password, FP1 in the first dataset is indicative of the firmware password of the UE 102. In an example, the value may be a random value (e.g., a true random value or a pseudo-random value). In an example, the value may be generated using a random value generator (e.g., a true random value generator or a pseudo-random value generator). In an example, the value may be different than the default firmware password, wherein one or more characteristics of the value may be indicative of the default firmware password. In an example, the one or more characteristics may comprise a length of the value. For example, the length of the value may be indicative of the default firmware password (e.g., the length of the value, such as a number of characters of the value, may indicate that the default firmware password is the firmware password of the UE 102). In some examples, the middle tier computer 104 and/or the password management computer 106 may determine that the default firmware password is the firmware password based upon FP1 being set to a value (e.g., a random value) having the length. In an example in which the length is 18 characters, the middle tier computer 104 and/or the password management computer 106 may determine that the default firmware password is the firmware password based upon FP1 being set to a value (e.g., a random value) that is 18 characters.

At 202, the UE 102 determines that FP1 is indicative of the firmware password of the firmware of the UE 102. In the first example scenario (in which it is determined that FP1 is the firmware password and/or FP1 is not set to a different value), the determination that FP1 is indicative of the firmware password (corresponds to the determination, of the first example scenario, that FP1 is the firmware password. In the second example scenario (in which it is determined that FP2 is the firmware password and/or FP1 is set to FP2), the determination that FP1 is indicative of the firmware password may correspond to the determination, of the second example scenario, that FP2 (to which FP1 is set) is the firmware password. In the third example scenario (in which it is determined that the default firmware password is the firmware password and/or FP1 is set to the default firmware password), the determination that FP1 is indicative of the firmware password may correspond to the determination, of the third example scenario, that the default firmware password (to which FP1 is set) is the firmware password. In the fourth example scenario (in which it is determined that the default firmware password is the firmware password and/or FP1 is set to a value, such as a random value, indicative of the default firmware password), the determination that FP1 is indicative of the firmware password may correspond to the determination, of the fourth example scenario, that the default firmware password is the firmware password, wherein FP1 is set to the value indicative of the default firmware password (e.g., a length of the value indicates that the default firmware password is the firmware password).

At 204, the UE 102 transmits FP1 to a first computer for storage in the second dataset. In some examples, the UE 102 transmits FP1 to the first computer for storage in the second dataset in response to the determination that FP1 is indicative of the firmware password. In some examples, the first computer is the middle tier computer 104. In response to receiving FP1 (comprising the firmware password) from the UE 102, the middle tier computer 104 may transmit FP1, received from the UE 102, to the password management computer 106, wherein the password management computer 106 may store FP1, received from the middle tier computer 104, in the second dataset of the password management computer 106. In an example in which FP1 is already stored in the second dataset of the password management computer 106 when FP1 is received from the middle tier computer 104, storing FP1 (received from the middle tier computer 104) in the second dataset may comprise setting FP1 in the second dataset to a value of FP1 received from the middle tier computer 104. In an example in which FP1 is unavailable in the second dataset of the password management computer 106 (e.g., FP1 is not stored in the second dataset) when FP1 is received from the middle tier computer 104, storing FP1 (received from the middle tier computer 104) in the second dataset may comprise adding FP1 received from the middle tier computer 104 to the second dataset.

At 206, the UE 102 may generate a password. In an example, the UE 102 may generate the password in response to transmitting FP1 to the first computer (e.g., the middle tier computer 104). The UE 102 may generate the password to be a random password (e.g., a true random password or a pseudo-random password), such as a random complex password (e.g., a true random password or a pseudo-random password). In an example, the password may be generated using a random password generator (e.g., a true random password generator or a pseudo-random password generator).

In some examples, the password may be generated based upon one or more password requirements. The one or more password requirements may be indicative of at least one of types of characters that are not to be included in the password (e.g., special characters, numerical characters, spaces, uppercase characters, lowercase characters, etc.), a character length of the password (e.g., 8 characters), etc. In an example, the password may be generated to meet the one or more password requirements. For example, if the one or more password requirements indicate that the character length is 8 characters and special characters are not to be included in the password, the password may be generated to be 8 characters long and without special characters. The one or more password requirements may correspond to firmware password requirements for the UE type of the UE 102. Alternatively and/or additionally, the one or more password requirements may correspond to firmware password requirements for all UE types of UEs for which firmware passwords are managed using the password management computer 106 and/or the password management system 101. In an example in which one or more first firmware password requirements associated with the first UE type indicates that special characters are not allowed but allows for spaces and one or more second firmware password requirements associated with the second UE type indicates that spaces are not allowed but allows for special characters, the password may be generated without spaces and without special characters to fulfill the one or more first firmware password requirements associated with the first UE type and the one or more second firmware password requirements associated with the second UE type.

At 208, the UE 102 may set FP2, in the first dataset of the UE 102, to the password (e.g., the random password). At 210, the UE 102 may transmit FP2, comprising the password, to the first computer (e.g., the middle tier computer 104) for storage in the second dataset of the password management computer 106.

In an example in which the first computer is the middle tier computer 104, in response to receiving FP2 (comprising the password) from the UE 102, the middle tier computer 104 may transmit FP2, received from the UE 102, to the password management computer 106, wherein the password management computer 106 may store FP2, received from the middle tier computer 104, in the second dataset of the password management computer 106. In an example in which FP2 is already stored in the second dataset of the password management computer 106 when FP2 is received from the middle tier computer 104, storing FP2 (received from the middle tier computer 104) in the second dataset may comprise setting FP2 in the second dataset to a value of FP2 received from the middle tier computer 104. In an example in which FP2 is unavailable in the second dataset of the password management computer 106 (e.g., FP2 is not stored in the second dataset) when FP2 is received from the middle tier computer 104, storing FP2 (received from the middle tier computer 104) in the second dataset may comprise adding FP2 received from the middle tier computer 104 to the second dataset.

At 212, the UE 102 may set the firmware password of the UE 102 to FP2 comprising the password (e.g., the random password). For example, the firmware password may be set to the password generated at act 206. In some examples, the UE 102 may set the firmware password of the UE 102 to FP2 by performing one or more operations. The one or more operations may be based upon the UE type of the UE 102 (corresponding to the manufacturer of the UE 102 and/or the model of the UE 102, for example). In an example, the one or more operations (for setting the firmware password to FP2) differ between UE types. For example, if the UE type is the first UE type, the one or more operations may be one or more third operations, and/or if the UE type is the second UE type, the one or more operations may be one or more fourth operations different than the one or more third operations. In some examples, one or more third classes, functions and/or modules used in the one or more third operations are different than one or more fourth classes, functions and/or modules used in the one or more fourth operations. In an example, the one or more third classes, functions and/or modules may comprise one or more third WMI classes defined for UEs of the first manufacturer of the first UE type and the one or more fourth classes, functions and/or modules may comprise one or more fourth WMI classes defined for UEs of the second manufacturer of the second UE type. The firmware password management software may comprise instructions for the UE 102 to perform the one or more third operations (with the one or more third classes, functions and/or modules) if the UE 102 is the first UE type (and/or the firmware password management software may instruct the UE 102 to perform the one or more third operations with the one or more third classes, functions and/or modules if the UE 102 is the first UE type). In an example, the one or more third operations may comprise one or more third WMI calls (corresponding to the one or more third WMI classes, for example). Alternatively and/or additionally, the firmware password management software may comprise instructions for the UE 102 to perform the one or more fourth operations (with the one or more fourth classes, functions and/or modules) if the UE 102 is the second UE type (and/or the firmware password management software may instruct the UE 102 to perform the one or more fourth operations with the one or more fourth classes, functions and/or modules if the UE 102 is the second UE type). In an example, the one or more fourth operations may comprise one or more fourth WMI calls (corresponding to the one or more fourth WMI classes, for example). Accordingly, the one or more operations may be performed (for setting the firmware password to FP2) according to the UE type of the UE 102, wherein by performing the one or more operations, the UE 102 may correctly set the firmware password of the UE 102 to FP2.

In some examples, in response to the firmware password being successfully set to the FP2 (e.g., FP2 comprising the password generated at act 206), the UE 102 may set FP1 in the first dataset to FP2 (e.g., the UE 102 may change the value of FP1 to the value of FP2 in the first dataset).

Alternatively and/or additionally, in response to the firmware password being successfully set to the FP2 (e.g., FP2 comprising the password generated at act 206), the UE 102 may transmit (after setting FP1 to FP2) FP1 to the first computer (e.g., the middle tier computer 104) for storage in the second dataset.

In an example in which the first computer is the middle tier computer 104, in response to receiving FP1 (comprising the firmware password) from the UE 102, the middle tier computer 104 may transmit FP1, received from the UE 102, to the password management computer 106, wherein the password management computer 106 may store FP1, received from the middle tier computer 104, in the second dataset of the password management computer 106. In an example in which FP1 is already stored in the second dataset of the password management computer 106 when FP1 is received from the middle tier computer 104, storing FP1 (received from the middle tier computer 104) in the second dataset may comprise setting FP1 in the second dataset to a value of FP1 received from the middle tier computer 104. In an example in which FP1 is unavailable in the second dataset of the password management computer 106 (e.g., FP1 is not stored in the second dataset) when FP1 is received from the middle tier computer 104, storing FP1 (received from the middle tier computer 104) in the second dataset may comprise adding FP1 received from the middle tier computer 104 to the second dataset.

In some examples, firmware password variables and/or other information may be encrypted in the first dataset and/or the second dataset. In the first dataset, firmware password variables and/or other information may be encrypted using a first encryption type (and/or the first dataset may be encrypted using the first encryption type). In the second dataset, firmware password variables and/or other information may be encrypted using a second encryption type (and/or the second dataset may be encrypted using the second encryption type). The first encryption type may be the same as the second encryption type. Alternatively and/or additionally, the first encryption type may be different than the second encryption type. In an example, the first encryption type may be Data Protection Application Programming Interface (DPAPI) encryption and/or the second encryption type may be AES encryption (e.g., AES 256-bit encryption).

In some examples, FP1, FP2 and/or the default firmware password in the first dataset may be accessed (e.g., accessed by a user, such as a technician) on the UE 102 by decrypting (using a key, for example) FP1, FP2 and/or the default firmware password (while the UE 102 is running in system context, for example).

In some examples, transmissions of firmware password variables between the UE 102, the middle tier computer 104 and/or the password management system 106 may be encrypted.

In an example, a transmission of a firmware password variable (e.g., FP1 or FP2) from the password management computer 106 to the middle tier computer 104 may be encrypted (e.g., at least one of TLS encrypted, SSL encrypted, HTTPS encrypted, etc.), such as using TLS 1.2 encryption or other type of encryption. Alternatively and/or additionally, the firmware password variable in the transmission may be encrypted using the second encryption type (e.g., AES encryption, such as AES 256-bit encryption). The middle tier computer 104 may have a key (e.g., a secret) to decrypt the firmware password variable (e.g., the firmware password variable encrypted using the second encryption type) to generate a decrypted firmware password variable (e.g., the key to encrypt the firmware password variable may be stored using the first encryption type, such as DPAPI). In an example, the key may be for the second encryption type (e.g., the key may be a AES 256-bit encryption key). The middle tier computer 104 may encrypt (e.g., re-encrypt) the decrypted firmware password variable. For example, the middle tier computer 104 may encrypt (e.g., re-encrypt) the decrypted firmware password variable using the first encryption type (e.g., DPAPI) to generate an encrypted firmware password variable. The middle tier computer 104 may transmit the encrypted firmware password variable to the UE 102. The transmission of the encrypted firmware password variable to the UE 102 may be encrypted (e.g., at least one of TLS encrypted, SSL encrypted, HTTPS encrypted, etc.), such as using TLS 1.2 encryption or other type of encryption. The UE 102 may decrypt the encrypted firmware password variable received from the middle tier computer 104 using a key, such as a key known to the UE 102 and the middle tier computer 104 (e.g., the key may correspond to a shared secret between the UE 102 and the middle tier computer 104, wherein the middle tier computer 104 may encrypt the firmware password variable using the key to generate the encrypted firmware password variable).

In an example, a transmission of a firmware password variable (e.g., FP1 or FP2) from the UE 102 to the middle tier computer 104 may be encrypted (e.g., at least one of TLS encrypted, SSL encrypted, HTTPS encrypted, etc.), such as using TLS 1.2 encryption or other type of encryption. Alternatively and/or additionally, the firmware password variable in the transmission may be encrypted using the first encryption type (e.g., DPAPI encryption). The middle tier computer 104 may have a key (e.g., a shared secret between the UE 102 and the middle tier computer 104) to decrypt the firmware password variable (e.g., the firmware password variable encrypted using the first encryption type) to generate a decrypted firmware password variable. The middle tier computer 104 may encrypt (e.g., re-encrypt) the decrypted firmware password variable. For example, the middle tier computer 104 may encrypt (e.g., re-encrypt) the decrypted firmware password variable using the second encryption type (e.g., AES encryption, such as AES 256-bit encryption) to generate an encrypted firmware password variable. The middle tier computer 104 may transmit the encrypted firmware password variable to the password management computer 106. The transmission of the encrypted firmware password variable to the password management computer 106 may be encrypted (e.g., at least one of TLS encrypted, SSL encrypted, HTTPS encrypted, etc.), such as using TLS 1.2 encryption or other type of encryption. The password management computer 106 may store the encrypted firmware password variable in the second dataset of the password management computer 106.

In some examples, the firmware of the UE 102 may correspond to at least one of Basic Input/Output System (BIOS) firmware, Unified Extensible Firmware Interface (UEFI) firmware, hardware initialization firmware, booting firmware, etc. In some examples, the first dataset of the UE 102 may be a UE registry.

In some examples, the middle tier computer 104 may comprise one or more computers (e.g., one or more servers). One, some and/or all computers of the one or more computers of the middle tier computer 104 may be connected to the UE 102 (via a network, for example) and/or connected to the password management computer 106 (via a network, for example).

In some examples, the password management computer 106 may comprise one or more computers (e.g., one or more servers), such as one or more database computers (e.g., one or more database servers). One, some and/or all computers of the one or more computers of the password management computer 106 may comprise memory on which at least a portion of the second dataset is stored. In an example, the second dataset may be hosted on one, some and/or all computers of the one or more computers of the password management computer 106. The second dataset of the password management computer 106 may be a database (e.g., a Structured Query Language (SQL) database or other type of database). The second dataset may store firmware passwords and/or firmware password variables associated with a plurality of UEs comprising the UE 102. The second dataset may store access records (e.g., information indicative of times at which firmware passwords are accessed and/or indicative of technicians and/or UEs that accessed the firmware passwords) associated with the plurality of UEs.

In some examples, acts 202, 204, 206, 208, 210 and/or 212 may be performed in response to an event, wherein the event comprises a determination that the one or more conditions are met (and/or wherein the event comprises a determination that the current time is the same as or after the firmware password rotation time).

Embodiments are contemplated in which the UE 102 and the password management computer 106 directly communicate with each other (without the middle tier computer 104, for example). In an example, the first computer (referred to with respect to the method 200 of FIG. 2) may be the password management computer 106. Alternatively and/or additionally, the password management computer 106 may directly communicate with at least one of one or more UEs (e.g., the UE 102) of the plurality of UEs, the second UE (and/or other technical support UEs), the firmware password retrieval application, etc. Throughout the present disclosure, a transmission of information to the middle tier computer 104 by an entity (e.g., the UE 102, the second UE and/or the firmware password retrieval application) may be replaced with a transmission of the information to the password management computer 106 (e.g., directly to the password management computer 106) by the entity. Alternatively and/or additionally, throughout the present disclosure, a transmission of information to the middle tier computer 104 by the password management computer 106 may be replaced with a transmission of the information to an entity (e.g., the UE 102, the second UE and/or the firmware password retrieval application).

Figure 3:
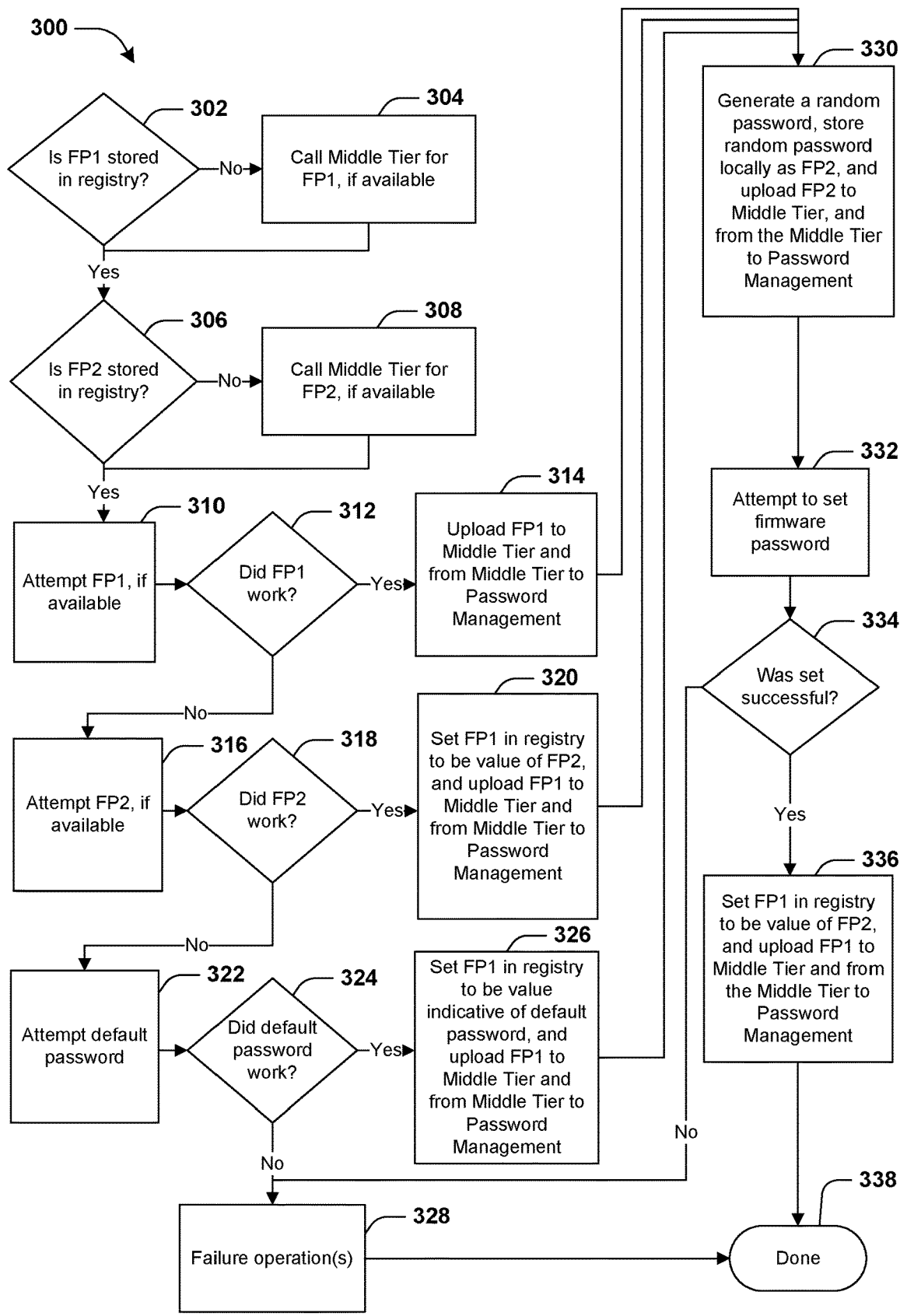
FIG. 3 is a flow chart illustrating a method for performing a firmware password rotation process in accordance with an embodiment.

An embodiment of performing the firmware password rotation process is illustrated by method 300 of FIG. 3, and is further described in conjunction with FIG. 1. At 302, the UE 102 may determine whether FP1 is stored in the first dataset (e.g., UE registry) of the UE 102. In response to a determination that FP1 is not stored in the first dataset, the UE 102 may, at 304, request the middle tier computer 104 to provide FP1 from the second dataset of the password management computer 106. At 306, the UE 102 may determine whether FP2 is stored in the first dataset (e.g., UE registry) of the UE 102. In response to a determination that FP2 is not stored in the first dataset, the UE 102 may, at 308, request the middle tier computer 104 to provide FP2 from the second dataset of the password management computer 106. At 310, the UE 102 may attempt FP1 as the firmware password if FP1 is available (e.g., if the UE 102 was able to retrieve FP1 from the first dataset at 302 and/or from the second dataset at 304). At 312, the UE 102 determines whether FP1 is the firmware password of the UE 102 (based upon a result of the attempt at 310, for example). In response to a determination, at 312, that FP1 is the firmware password of the UE 102, the UE 102 may, at 314, transmit FP1 to the middle tier computer 104, wherein the middle tier computer 104 transmits FP1 (received from the UE 102) to the password management computer 106 for storage in the second dataset. In response to a determination, at 312, that FP1 is not the firmware password of the UE 102, the UE 102 may, at 316, attempt FP2 as the firmware password if FP2 is available (e.g., if the UE 102 was able to retrieve FP2 from the first dataset at 306 and/or from the second dataset at 306). At 318, the UE 102 determines whether FP2 is the firmware password of the UE 102 (based upon a result of the attempt at 316, for example). In response to a determination, at 318, that FP2 is the firmware password of the UE 102, the UE 102 may, at 320, set FP1 to FP2 (e.g., change the value of FP1 in the first dataset to the value of FP2 corresponding to the firmware password) and transmit FP1 (comprising the value of FP2) to the middle tier computer 104, wherein the middle tier computer 104 transmits FP1 (received from the UE 102) to the password management computer 106 for storage in the second dataset. In response to a determination, at 318, that FP2 is not the firmware password of the UE 102, the UE 102 may, at 322, attempt the default firmware password as the firmware password. In response to a determination, at 324, that the default firmware password is the firmware password of the UE 102, the UE 102 may, at 326, set FP1 to the default firmware password (e.g., change the value of FP1 in the first dataset to the value of the default firmware password corresponding to the firmware password) and transmit FP1 (comprising the value of the default firmware password) to the middle tier computer 104, wherein the middle tier computer 104 transmits FP1 (received from the UE 102) to the password management computer 106 for storage in the second dataset. Alternatively and/or additionally, in response to a determination, at 324, that the default firmware password is the firmware password of the UE 102, the UE 102 may, at 326, set FP1 to a value (e.g., a random value) indicative of the default firmware password (e.g., change the value of FP1 in the first dataset to a value with a length indicative of the default firmware password corresponding to the firmware password) and transmit FP1 (comprising the value with the length indicative of the default firmware password) to the middle tier computer 104, wherein the middle tier computer 104 transmits FP1 (received from the UE 102) to the password management computer 106 for storage in the second dataset. In response to a determination, at 324, that the default firmware password is not the firmware password of the UE 102, the UE 102 may, at 328, perform one or more failure operations. The one or more failure operations may comprise at least one of cancelling the firmware password rotation process, disabling firmware password management of the UE 102 using the password management system 101, deactivating the firmware password management software of the UE 102, sending an alert to one or more UEs (e.g., technical support UEs), blocking one or more functions of the UE 102 (e.g., the one or more functions may comprise a re-imaging function of the UE 102, wherein blocking the re-imaging function may prevent the UE 102 from being re-imaged and/or an OS of the UE 102 from being replaced), etc.

In some examples, in response to transmitting FP1 to the middle tier computer 104 (e.g., at 314, 320 and/or 326), the UE 102 may, at 330, generate a random password (e.g., a random complex password), store the random password as FP2 in the first dataset of the UE 102 (e.g., set FP2 in the first dataset to the random password), and transmit FP2 (comprising the random password) to the middle tier computer 104, wherein the middle tier computer 104 transmits FP2 (received from the UE 102) to the password management computer 106 for storage in the second dataset. For example, the password management computer 106 may set FP2, in the second dataset, to the random password. Alternatively and/or additionally, the UE 102 may transmit the random password to the middle tier computer 104, wherein the middle tier computer 104 transmits the random password (received from the UE 102) to the password management computer 106 for storage in the second dataset, and wherein the password management computer 106 stores the random password separately from FP2 without changing the value of FP2 to the random password in the second dataset.

At 332, the UE 102 may attempt to set the firmware password of the UE 102 to FP2 (comprising the random password). The UE 102 may determine, at 334, whether the firmware password is successfully set to FP2. In response to a determination, at 334, that the firmware password is successfully set to FP2, the UE 102 may, at 336, set FP1 in the first dataset FP2 (e.g., change the value of FP1 in the first dataset to the value of FP2 to which the firmware password was successfully set) and transmit FP1 (comprising the value of FP1 to which the firmware password was successfully set) to the middle tier computer 104, wherein the middle tier computer 104 transmits FP1 (received from the UE 102) to the password management computer 106 for storage in the second dataset. Accordingly, the method 300 enables performance of the firmware password rotation process in accordance with the techniques presented herein, and so may be complete at 338. In response to a determination, at 334, that the firmware password is not successfully set to FP2, the UE 102 may, at 328, perform the one or more failure operations.

In some examples, the one or more failure operations may be performed in response to a determination that data of the firmware of the UE 102 (e.g., data corresponding to one or more classes, functions and/or modules of the firmware) is corrupted. For example, the data may be periodically checked (and/or checked during the firmware password rotation process) to determine whether the data is corrupted.

It may be appreciated that maintaining multiple firmware password variables (e.g., FP1 and/or FP2) in multiple locations (e.g., the first dataset of the UE 102 and/or the second dataset of the password management computer 106) and/or by updating the firmware password variables using one or more of the techniques provided with respect to the method 200 and/or the method 300 provides for a fallback to be able to access the firmware password of the UE 102 in case the firmware password rotation process is performed incorrectly and/or with errors and/or in case data stored in memory of the UE 102 and/or the password management computer 106 is deleted. For example, scenarios may occur (e.g., due to one or more errors in the firmware password rotation process, such as unsuccessful transmission and/or one or more computing errors) where FP1 in the first dataset and/or the second dataset is considered to be the firmware password of the UE 102, but where FP2 or the default firmware password is actually the firmware password of the UE 102. Accordingly, by storing and/or maintaining the multiple firmware password variables, the firmware password of the UE 102 may be recovered. In an example, an interface (e.g., the firmware password retrieval interface) may be displayed via the second UE, wherein the multiple firmware password variables may be retrieved from the second dataset of the password management computer 106 and/or accessed via the interface. For example, the second UE and/or the firmware password retrieval application may transmit a request (e.g., a request to provide the second UE with access to the multiple firmware passwords) to the middle tier computer 104. In response to receiving the request, the middle tier computer 104 may retrieve the multiple firmware password variables from the password management computer 106 (e.g., the middle tier computer 104 may receive encrypted information comprising the multiple firmware passwords from the password management computer 106). The middle tier computer 104 may decrypt the multiple firmware password variables received from the password management computer 106. The middle tier computer 104 may encrypt (e.g., re-encrypt) the decrypted multiple firmware password variables using a key, such as a key known to the second UE and the middle tier computer 104 (e.g., the key may correspond to a shared secret between the second UE and the middle tier computer 104, wherein the middle tier computer 104 may encrypt the multiple firmware password variables using the key) and/or the middle tier computer 104 may transmit the re-encrypted multiple firmware password variables to the second UE and/or the firmware password retrieval application, wherein the second UE and/or the firmware password retrieval application may present the multiple firmware password variables via the interface. Alternatively and/or additionally, records of firmware password rotation processes (e.g., records indicating at least one of historical values of FP1 and/or FP2, times at which the values of FP1 and/or FP2 were changed and/or received, etc.) may be stored in the second dataset and/or may be displayed via the interface. Alternatively and/or additionally, the multiple firmware password variables may be accessed via the UE 102. Accordingly, in cases in which errors occur, multiple firmware password variables (and/or historical values of the multiple firmware password variables) associated with the UE 102 may be accessed and/or used to determine the firmware password of the UE 102.

Although embodiments are described with respect to the multiple firmware password variables comprising two firmware password variables (e.g., FP1 and FP2), the password management system 101 may use any quantity of firmware password variables for performing the firmware password rotation process.

Figure 4:
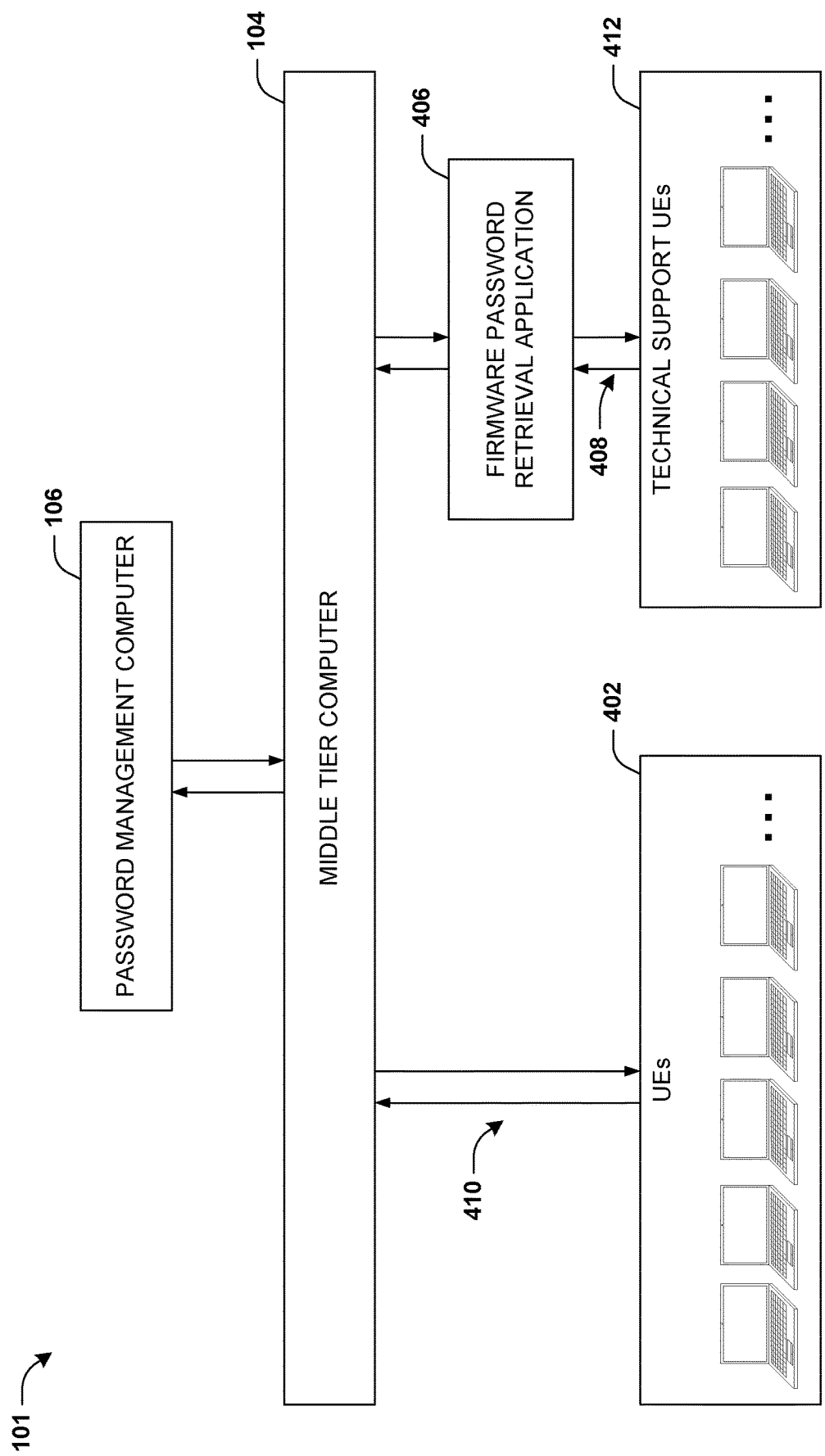
FIG. 4 is a diagram illustrating a firmware password management system in accordance with an embodiment.

FIG. 4 illustrates an example of the firmware password management system 101 comprising a plurality of UEs 402, a plurality of technical support UEs 412, the middle tier computer 104, the password management computer 106 and/or the firmware password retrieval application (shown with reference number 406). The plurality of UEs 402 may comprise UEs, such as the UE 102, for which firmware password management services are provided by the firmware password management system 101. In an example, one or more techniques provided herein with respect to managing firmware passwords of the UE 102 may be implemented, using the password management system 101, the middle tier computer 104, and/or the password management computer 106, for each UE of one, some and/or all UEs of the plurality of UEs 402. For example, the second dataset of the password management computer 106 may store and/or maintain firmware passwords, firmware password variables and/or access records associated with one, some and/or all UEs of the plurality of UEs 402 (wherein the firmware passwords, the firmware password variables and/or the access records may be accessed and/or displayed on one or more UEs, such as one or more UEs of the plurality of technical support UEs 412). Alternatively and/or additionally, firmware password rotation processes may be initiated and/or performed (e.g., automatically) for one, some and/or all UEs of the plurality of UEs 402 using the one or more techniques provided herein with respect to the firmware password rotation process of the UE 102. In some examples, the plurality of UEs 402 may communicate 410 with the middle tier computer 104 (e.g., the plurality of UEs 402 may communicate 410 with computers of the middle tier computer 104) using one or more of the techniques provided herein with respect to communication between the UE 102 and the middle tier computer 104. In some examples, the firmware password management software may be installed (e.g., automatically installed) on UEs of the plurality of UEs 402. In an example in which the plurality of UEs 402 comprises UEs of different UE types (e.g., at least one of different manufacturers, different models, etc.), firmware passwords of the plurality of UEs 402 may be managed automatically using one or more of the techniques provided herein.

In some examples, the plurality of technical support UEs 412 may comprise the second UE. The plurality of technical support UEs 412 may communicate 408 with the firmware password retrieval application 406 to access one or more firmware passwords of one or more UEs (of the plurality of UEs 402, for example) using one or more of the techniques provided herein with respect to the second UE accessing the firmware password of the UE 102.

Implementation of at least some of the disclosed subject matter may lead to more effective management (e.g., automatic management) of firmware passwords of the plurality of UEs 402 (even if UEs of the plurality of UEs 402 have different UE types, for example). Alternatively and/or additionally, implementation of at least some of the disclosure may lead to increased security (such as a result of automatically initiating and/or performing firmware password rotation processes for UEs of the plurality of UEs 402, wherein the firmware password rotation processes may be initiated and/or performed in response to firmware passwords of the UEs being accessed and/or wherein the firmware password rotation processes may be initiated and/or performed periodically). Alternatively and/or additionally, implementation of at least some of the disclosure may lead to less manual effort (such as a result of providing a technical support UE with access to a requested firmware password of a UE without a technician being required to manually open and/or access the UE).

According to some embodiments, a method is provided. The method includes determining, by a UE, that a first firmware password variable is indicative of a firmware password of a firmware of the UE; transmitting, by the UE, the first firmware password variable to a first computer for storage in a first dataset; generating, by the UE, a password; setting, by the UE, a second firmware password variable, in a second dataset stored on the UE, to the password; transmitting, by the UE, the second firmware password variable including the password to the first computer for storage in the first dataset; and setting, by the UE, the firmware password of the firmware of the UE to the second firmware password variable including the password.

According to some embodiments, the method includes in response to the firmware password being successfully set to the second firmware password variable including the password: setting, by the UE, the first firmware password variable to the second firmware password variable in the second dataset; and transmitting, by the UE, the first firmware password variable to the first computer for storage in the first dataset.

According to some embodiments, determining that the first firmware password variable is the firmware password, transmitting the first firmware password variable to the first computer, generating the password, setting the second firmware password variable to the password in the second dataset, transmitting the second firmware password variable comprising the password to the first computer for storage in the first dataset, and/or setting the firmware password of the firmware of the UE to the second firmware password variable comprising the password are performed in response to an event, wherein the event comprises a determination that a current time is the same as or after a firmware password rotation time, wherein the firmware password rotation time is based upon an access time associated with a second UE being provided with access to the firmware password.

According to some embodiments, setting the firmware password to the second firmware password variable is performed based upon a manufacturer of the UE and/or a model of the UE.

According to some embodiments, the method includes prior to transmitting the first firmware password variable to the first computer, determining, by the UE, the first firmware password variable by: analyzing the second dataset to determine whether the first firmware password variable is stored in the second dataset; and in response to a determination that an indication of the first firmware password variable is stored in the second dataset, determining the first firmware password variable based upon the indication.

According to some embodiments, the method includes prior to transmitting the first firmware password variable to the first computer, determining, by the UE, the first firmware password variable by: analyzing the second dataset to determine whether the first firmware password variable is stored in the second dataset; and in response to a determination that the first firmware password variable is not stored in the second dataset, determining the first firmware password variable based upon an indication of the first firmware password variable stored in the first dataset.

According to some embodiments, the method includes prior to transmitting the first firmware password variable to the first computer: determining, by the UE, that the first firmware password variable is not available and/or is not the firmware password of the firmware of the UE; determining, by the UE, that the second firmware password variable is the firmware password of the firmware of the UE; and in response to the determination that the second firmware password variable is the firmware password of the firmware of the UE, setting, by the UE, the first firmware password variable, in the second dataset stored on the UE, to the second firmware password variable, wherein the determination that the first firmware password variable is indicative of the firmware password of the firmware of the UE corresponds to the determination that the second firmware password variable is the firmware password of the firmware of the UE.

According to some embodiments, the method includes prior to transmitting the first firmware password variable to the first computer: determining, by the UE, that the first firmware password variable is not available and/or is not the firmware password of the firmware of the UE and/or that the second firmware password variable is not available and/or is not the firmware password of the firmware of the UE; determining, by the UE, that a default firmware password is the firmware password of the firmware of the UE; and in response to the determination that the default firmware password is the firmware password of the firmware of the UE, setting the first firmware password variable, in the second dataset stored on the UE, to a value indicative of the default firmware password, wherein the determination that the first firmware password variable is indicative of the firmware password of the firmware of the UE corresponds to the determination that the default firmware password is the firmware password of the firmware of the UE.

According to some embodiments, the first dataset is stored on a second computer with which the first computer communicates.

According to some embodiments, the password is generated to be a random password.

According to some embodiments, a system is provided. The system includes a UE configured to initiate a firmware password rotation process, a middle tier computer and a password management computer. During the firmware password rotation process, the UE is configured to: in response to a determination that a first firmware password variable is indicative of a firmware password of a firmware of the UE, perform a first transmission of the first firmware password variable to a middle tier computer; generate a password; set a second firmware password variable, in a first dataset stored on the UE, to the password; perform a second transmission of the second firmware password variable, including the password, to the middle tier computer; and set the firmware password of the firmware of the UE to the second firmware password variable including the password. The middle tier computer is configured to: in response to receiving the first firmware password variable via the first transmission, perform a third transmission of the first firmware password variable to a password management computer; and in response to receiving the second firmware password variable via the second transmission, perform a fourth transmission of the second firmware password variable to the password management computer. The password management computer is configured to: in response to receiving the first firmware password variable via the third transmission, store the first firmware password variable in a second dataset stored on the password management computer; and in response to receiving the second firmware password variable via the fourth transmission, store the second firmware password variable in the second dataset.

According to some embodiments, the middle tier computer is configured to: receive a first request to provide a second UE with access to the firmware password of the firmware of the UE; in response to receiving the first request, transmit a second request, for the firmware password, to the password management computer; in response to transmitting the second request, receive the firmware password from the password management computer; and in response to receiving the information, transmit the firmware password to a firmware password retrieval application and/or the second UE.

According to some embodiments, the password management computer is configured to determine a firmware password rotation time based upon a time of transmission of the first request, a time of transmission of the second request, a time of transmission of the firmware password to the middle tier computer, and/or a time of transmission of the firmware password to the firmware password retrieval application and/or the second UE; and the UE is configured to initiate the firmware password rotation process based upon a current time being the same as or after the firmware password rotation time.

According to some embodiments, the UE is configured to generate the password to be a random password.

According to some embodiments, after initiating the firmware password rotation process and prior to performing the first transmission, the UE is configured to determine the first firmware password variable by: analyzing the first dataset to determine whether the first firmware password variable is stored in the first dataset; and in response to a determination that an indication of the first firmware password variable is stored in the first dataset, determining the first firmware password variable based upon the indication.

According to some embodiments, after initiating the firmware password rotation process and prior to performing the first transmission, the UE is configured to: determine that the first firmware password variable is not available and/or is not the firmware password of the firmware of the UE; determine that the second firmware password variable is the firmware password of the firmware of the UE; and in response to the determination that the second firmware password variable is the firmware password of the firmware of the UE, set the first firmware password variable, in the first dataset stored on the UE, to the second firmware password variable, wherein the determination that the first firmware password variable is indicative of the firmware password of the firmware of the UE corresponds to the determination that the second firmware password variable is the firmware password of the firmware of the UE.

According to some embodiments, after initiating the firmware password rotation process and prior to performing the first transmission, the UE is configured to: determine that the first firmware password variable is not available and/or is not the firmware password of the firmware of the UE and/or that the second firmware password variable is not available and/or is not the firmware password of the firmware of the UE; determine that a default firmware password is the firmware password of the firmware of the UE; and in response to the determination that the default firmware password is the firmware password of the firmware of the UE, set the first firmware password variable, in the first dataset stored on the UE, to a value indicative of the default firmware password, wherein the determination that the first firmware password variable is indicative of the firmware password of the firmware of the UE corresponds to the determination that the default firmware password is the firmware password of the firmware of the UE.

According to some embodiments, a device including a processor is provided. The processor is configured to determine that a first firmware password variable is indicative of a firmware password of a firmware of a UE, transmit the first firmware password variable to a first computer for storage in a first dataset; generate a password; set a second firmware password variable, in a second dataset stored on the UE, to the password; transmit the second firmware password variable including the password to the first computer for storage in the first dataset; and set the firmware password of the firmware of the UE to the second firmware password variable including the password.

According to some embodiments, the first dataset is stored on a second computer with which the first computer communicates.

According to some embodiments, the password is generated to be a random password.

Figure 5:
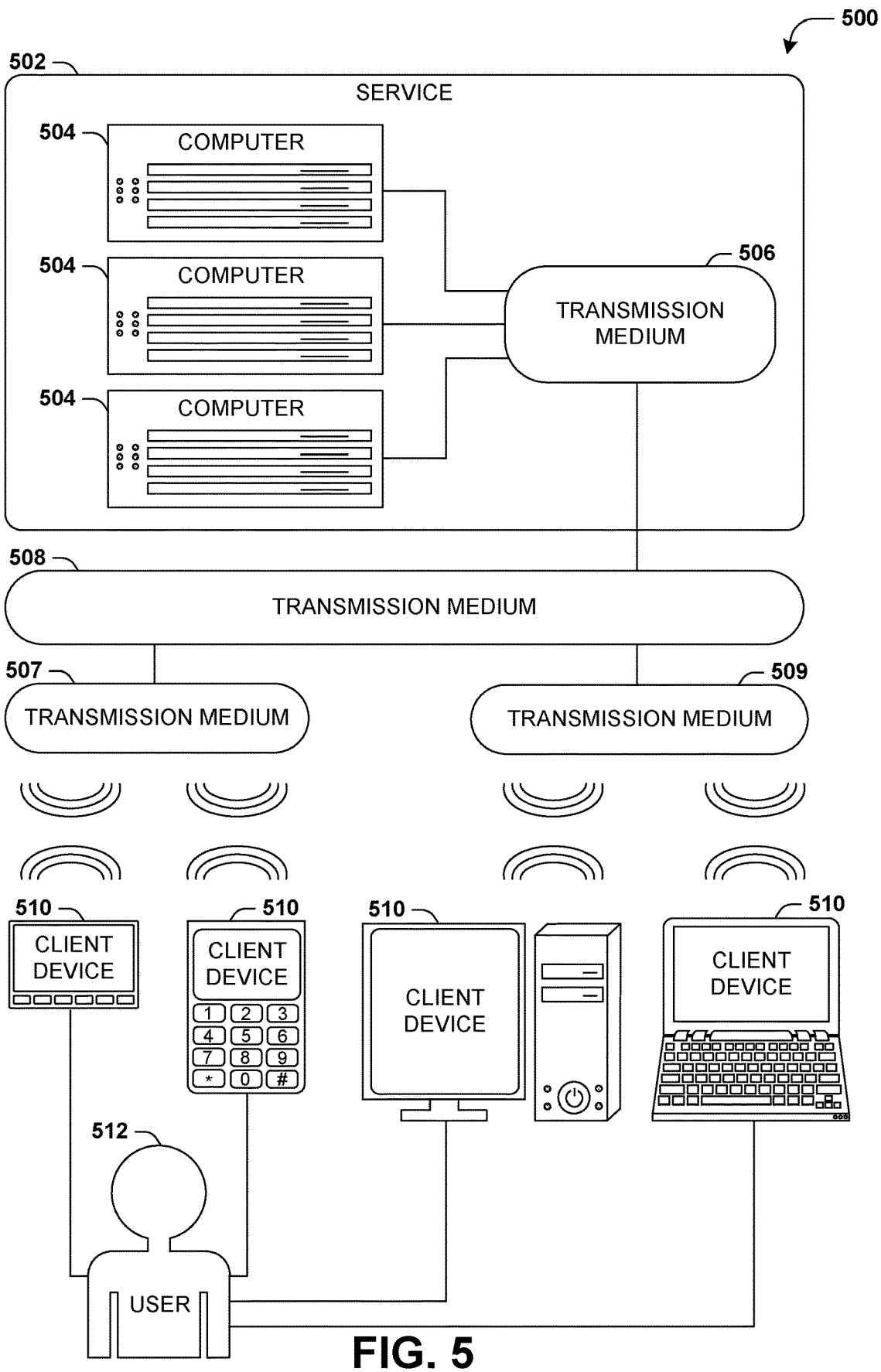
FIG. 5 is an illustration of a scenario involving various examples of transmission mediums that may be used to communicatively couple computers and clients.

FIG. 5 is an interaction diagram of a scenario 500 illustrating a service 502 provided by a set of computers 504 to a set of client devices 510 (e.g., a set of UEs 510) via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figure 6:
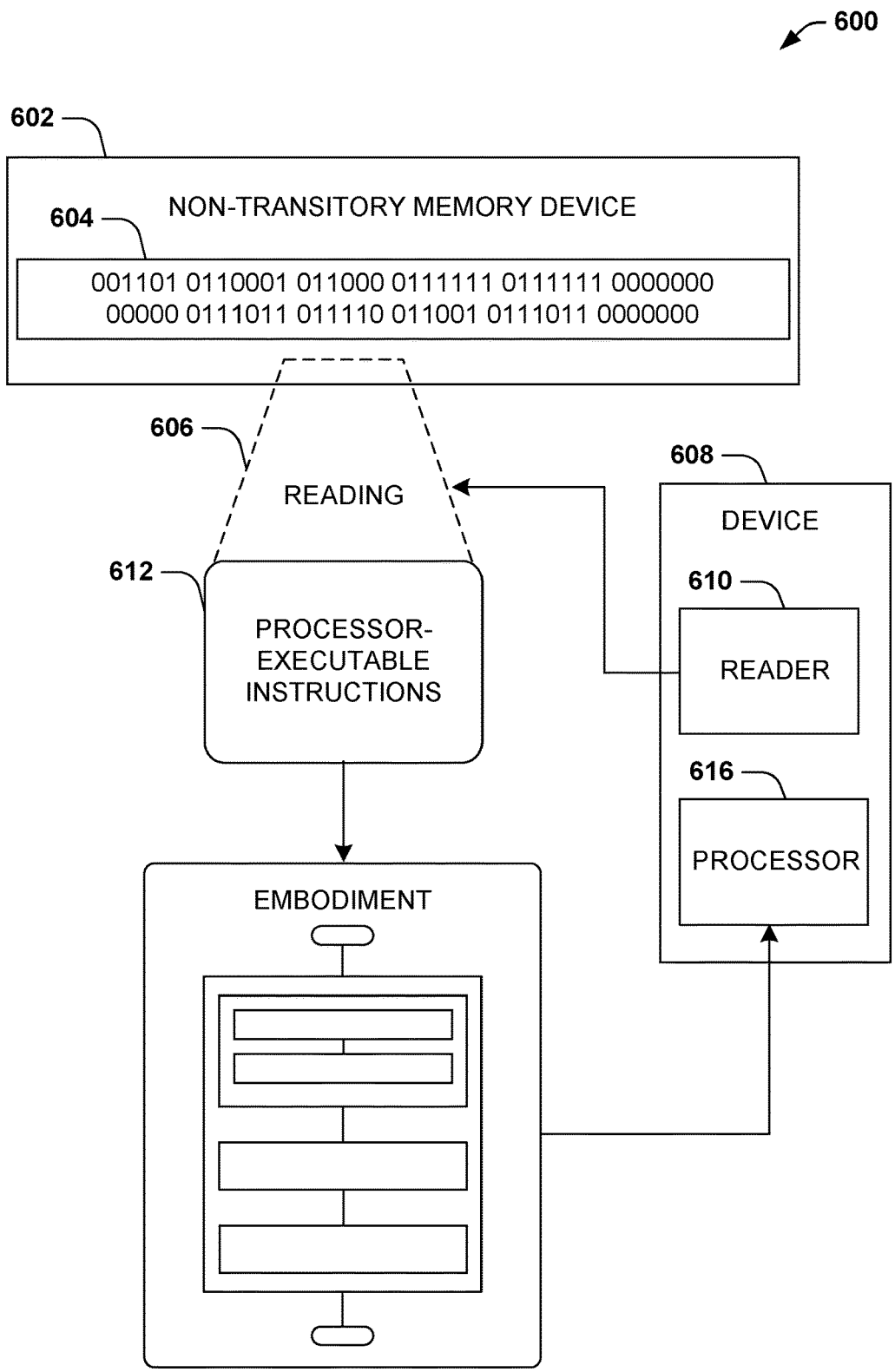
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the method 200 of FIG. 2, and/or the method 300 of FIG. 3, for example. In some embodiments, the processor-executable instructions 612 are configured to cause implementation of a system, such as at least some of the firmware password management system 101 of FIG. 1 and/or the firmware password management system 101 of FIG. 4, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for performing firmware password rotation, the method comprising:
 determining, by a User Equipment (UE), that a first firmware password variable is indicative of a firmware password of a firmware of the UE by:
  analyzing a first dataset stored on the UE to determine whether the first firmware password variable is stored in the first dataset;
  if an indication of the first firmware password variable is stored in the first dataset, determining the first firmware password variable based upon the indication; and
  if the first firmware password variable is not stored in the first dataset, determining the first firmware password variable based upon an indication of the first firmware password variable stored in a second dataset stored on a password management computer;
 if the first firmware password variable was determined based upon the indication stored in the first dataset, transmitting, by the UE, the first firmware password variable to a first computer for storage in the second dataset stored on the password management computer;
 generating, by the UE, a password;
 setting, by the UE, a second firmware password variable, in the first dataset stored on the UE, to be indicative of the password;
 transmitting, by the UE, the second firmware password variable comprising the password to the first computer for storage in the second dataset stored on the password management computer; and
 setting, by the UE, the firmware password of the firmware of the UE to the second firmware password variable comprising the password.

2. The method of claim 1, further comprising:
in response to the firmware password being successfully set to the second firmware password variable comprising the password:
 setting, by the UE, the first firmware password variable to the second firmware password variable in the first dataset; and
 transmitting, by the UE, the first firmware password variable to the first computer for storage in the second dataset.

3. The method of claim 1, wherein:
at least one of determining that the first firmware password variable is the firmware password, transmitting the first firmware password variable to the first computer, generating the password, setting the second firmware password variable to the password in the first dataset, transmitting the second firmware password variable comprising the password to the first computer for storage in the second dataset, or setting the firmware password of the firmware of the UE to the second firmware password variable comprising the password is performed in response to an event, wherein the event comprises a determination that a current time is the same as or after a firmware password rotation time, wherein the firmware password rotation time is based upon an access time associated with a second UE being provided with access to the firmware password.

4. The method of claim 1, wherein:
setting the firmware password to the second firmware password variable is performed based upon at least one of a manufacturer of the UE or a model of the UE.

5. The method of claim 1, wherein:
when the first firmware password variable is stored in the first dataset, the first firmware password variable is determined based upon the indication.

6. The method of claim 1, wherein:
when the first firmware password variable is not stored in the first dataset, the first firmware password variable is determined based upon the indication of the first firmware password variable stored in the second dataset.

7. The method of claim 1, further comprising:
prior to transmitting the first firmware password variable to the first computer:
 determining, by the UE, that the first firmware password variable is at least one of not available or is not the firmware password of the firmware of the UE;
 determining, by the UE, that the second firmware password variable is the firmware password of the firmware of the UE; and
 in response to the determination that the second firmware password variable is the firmware password of the firmware of the UE, setting, by the UE, the first firmware password variable, in the first dataset stored on the UE, to the second firmware password variable, wherein the determination that the first firmware password variable is indicative of the firmware password of the firmware of the UE corresponds to the determination that the second firmware password variable is the firmware password of the firmware of the UE.

8. The method of claim 1, further comprising:
prior to transmitting the first firmware password variable to the first computer:
determining, by the UE, that at least one of:
the first firmware password variable is at least one of not available or is not the firmware password of the firmware of the UE; or
the second firmware password variable is at least one of not available or is not the firmware password of the firmware of the UE;
determining, by the UE, that a default firmware password is the firmware password of the firmware of the UE; and
in response to the determination that the default firmware password is the firmware password of the firmware of the UE, setting the first firmware password variable, in the first dataset stored on the UE, to a value indicative of the default firmware password, wherein the determination that the first firmware password variable is indicative of the firmware password of the firmware of the UE corresponds to the determination that the default firmware password is the firmware password of the firmware of the UE.

9. The method of claim 1, wherein:
the password management computer communicates with the first computer.

10. The method of claim 1, wherein:
the password is generated to be a random password.

11. A device configured to perform firmware password rotation, the device comprising:
a processor configured to:
determine that a first firmware password variable is indicative of a firmware password of a firmware of a User Equipment (UE) by:
analyzing a first dataset stored on the UE to determine whether the first firmware password variable is stored in the first dataset;
if an indication of the first firmware password variable is stored in the first dataset, determining the first firmware password variable based upon the indication; and
if the first firmware password variable is not stored in the first dataset, determining the first firmware password variable based upon an indication of the first firmware password variable stored in a second dataset stored on a password management computer;
if the first firmware password variable was determined based upon the indication stored in the first dataset, transmit the first firmware password variable to a first computer for storage in the second dataset stored on the password management computer;
generate a password;
set a second firmware password variable, in the first dataset stored on the UE, to be indicative of the password;
transmit the second firmware password variable comprising the password to the first computer for storage in the second dataset stored on the password management computer; and
set the firmware password of the firmware of the UE to the second firmware password variable comprising the password.

12. The device of claim 11, wherein:
the password management computer communicates with the first computer.

13. The device of claim 11, wherein:
the password is generated to be a random password.

14. A non-transitory computer-readable medium storing instructions that when executed facilitate performance of operations for performing firmware password rotation, the operations comprising:
determining, by a User Equipment (UE), that a first firmware password variable is indicative of a firmware password of a firmware of the UE by:
analyzing a first dataset stored on the UE to determine whether the first firmware password variable is stored in the first dataset;
if an indication of the first firmware password variable is stored in the first dataset, determining the first firmware password variable based upon the indication; and
if the first firmware password variable is not stored in the first dataset, determining the first firmware password variable based upon an indication of the first firmware password variable stored in a second dataset stored on a pas sword management computer;
if the first firmware password variable was determined based upon the indication stored in the first dataset, transmitting, by the UE, the first firmware password variable to a first computer for storage in the second dataset stored on the password management computer;
generating, by the UE, a password;
setting, by the UE, a second firmware password variable, in the first dataset stored on the UE, to be indicative of the password;
transmitting, by the UE, the second firmware password variable comprising the password to the first computer for storage in the second dataset stored on the password management computer; and
setting, by the UE, the firmware password of the firmware of the UE to the second firmware password variable comprising the password.

15. The non-transitory computer-readable medium of claim 14, the operations further comprising:
in response to the firmware password being successfully set to the second firmware password variable comprising the password:
setting, by the UE, the first firmware password variable to the second firmware password variable in the first dataset; and
transmitting, by the UE, the first firmware password variable to the first computer for storage in the second dataset.

16. The non-transitory computer-readable medium of claim 14, wherein:
at least one of determining that the first firmware password variable is the firmware password, transmitting the first firmware password variable to the first computer, generating the password, setting the second firmware password variable to the password in the first dataset, transmitting the second firmware password variable comprising the password to the first computer for storage in the second dataset, or setting the firmware password of the firmware of the UE to the second firmware password variable comprising the password is performed in response to an event, wherein the event comprises a determination that a current time is the same as or after a firmware password rotation time, wherein the firmware password rotation time is based upon an access time associated with a second UE being provided with access to the firmware password.

17. The non-transitory computer-readable medium of claim 14, wherein:
setting the firmware password to the second firmware password variable is performed based upon at least one of a manufacturer of the UE or a model of the UE.

18. The non-transitory computer-readable medium of claim 14, wherein:
when the first firmware password variable is stored in the first dataset, the first firmware password variable is determined based upon the indication.

19. The non-transitory computer-readable medium of claim 14, wherein:
when the first firmware password variable is not stored in the first dataset, the first firmware password variable is determined based upon the indication of the first firmware password variable stored in the second dataset.

20. The non-transitory computer-readable medium of claim 14, the operations further comprising:
prior to transmitting the first firmware password variable to the first computer:
determining, by the UE, that the first firmware password variable is at least one of not available or is not the firmware password of the firmware of the UE;
determining, by the UE, that the second firmware password variable is the firmware password of the firmware of the UE; and
in response to the determination that the second firmware password variable is the firmware password of the firmware of the UE, setting, by the UE, the first firmware password variable, in the first dataset stored on the UE, to the second firmware password variable, wherein the determination that the first firmware password variable is indicative of the firmware password of the firmware of the UE corresponds to the determination that the second firmware password variable is the firmware password of the firmware of the UE.

* * * * *